United States Patent
Vaughan (10) Patent No.: US 8,145,186 B1
(45) Date of Patent: Mar. 27, 2012

(54) ASSESSING THE COMPARATIVE PERFORMANCE OF TELECOMMUNICATION SERVICE AREAS

(75) Inventor: Gary Francis Vaughan, Centennial, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 1031 days.

(21) Appl. No.: 12/058,815

(22) Filed: Mar. 31, 2008

(51) Int. Cl.
  *H04M 11/00* (2006.01)
  *H04W 40/00* (2009.01)
  *H04W 72/00* (2009.01)
(52) U.S. Cl. ...... 455/405; 455/446; 455/448; 455/452.2
(58) Field of Classification Search .................. 455/446, 455/423, 405, 448, 450, 452.1, 452.2
See application file for complete search history.

(56) References Cited

U.S. PATENT DOCUMENTS

| | | | |
|---|---|---|---|
| 7,218,928 B2 | 5/2007 | Park et al. | |
| 7,356,340 B2* | 4/2008 | Hamilton | 455/425 |
| 7,738,864 B2* | 6/2010 | Donovan et al. | 455/423 |
| 2005/0064820 A1 | 3/2005 | Park et al. | |
| 2005/0192001 A1* | 9/2005 | Samuel | 455/423 |
| 2006/0009160 A1* | 1/2006 | Craig | 455/67.11 |
| 2006/0258348 A1* | 11/2006 | Rajala | 455/423 |

* cited by examiner

*Primary Examiner* — Un C Cho (57) ABSTRACT

The present invention provides a method, system, and software product for assessing the performance of at least one telecommunications service area wherein the method comprises providing for the telecommunications service area performance information comprising service area rate of blocked calls, service area rate of dropped calls, and service area number of attempted calls. Additionally, the performance information for the service area to generate a Performance Value therefore. The present invention further comprises comparing the Performance Values of at least first and second service areas to provide a basis for making decisions regarding maintenance, repair, or replacement activities of hardware and software relating to a service area.

22 Claims, 9 Drawing Sheets

ASSESSING THE COMPARATIVE PERFORMANCE OF TELECOMMUNICATION SERVICE AREAS

TECHNICAL BACKGROUND

The mobile telephone industry, commonly referred to as the cellular or cell phone industry, is committed to providing continuously improved service to its customers. To that end, it seeks to reduce the occurrence of common customer irritants such as dropped calls and blocked call attempts.

At the most basic level, dropped calls and blocked calls are exactly what their names imply. Dropped calls occur after a connection is made between two or more phones and the connection is subsequently lost. This loss or drop in the connection can occur for a number of reasons, such as an inability of the cellular system to handle a hand-off between two cell sites, movement of one of the phones into an area of low signal coverage, obstructions such as buildings, equipment or software problems at a base station, or even weather related events such as thunderstorms.

Blocked calls are calls that are prevented from connecting in the first instance. Often a customer may hear a message to the effect that all circuits are busy. Blocked calls typically occur because the number of attempted calls overwhelms the available system resources. The percentage of blocked call attempts increases where there are periodic large gatherings of people, for example, at large sporting events such as professional football games, conventions, or the like. Certain holidays typically see an increase in the number of call attempts and consequently an increase in the blocked call rate. Additionally, disasters can increase the number of call attempts as people seek information on the events of the disaster and loved ones who may be caught up in those events. This increase in the number of call attempts in turn leads to an increase in the rate of blocked calls.

While blocked and dropped calls are often the most noticeable occurrences affecting customer service, there are other well-known factors that also do so. Among them are sound quality and line static. Telecommunication service providers are thus faced with large amounts of data indicative of good or bad customer service that can vary dramatically over time—hourly, daily, weekly, monthly, and yearly—as well as across service areas. This data must be properly analyzed as a whole to determine where available funds for service improvements should be directed. In addition, it is important to be able to analyze the available information to determine whether service level fluctuations result from intermittent occurrences, such as a convention, or are indicative of longer term deficiencies in the system toward which funds should be directed to attempt to remedy those deficiencies.

What remains when presented with the available data, is to analyze it properly to determine where within a telecommunications system the available funds should be directed to improve service.

OVERVIEW

The present invention provides a method, system, and software product for assessing the performance of at least one telecommunications service area wherein the method comprises providing for the telecommunications service area performance information comprising service area rate of blocked calls, service area rate of dropped calls, and service area number of attempted calls. The method further comprises processing the performance information for the service area to generate a Performance Value and comparing the Performance Values of at least first and second service areas to provide a basis for making decisions regarding maintenance, repair, or replacement activities of hardware and software relating to a service area.

BRIEF DESCRIPTION OF THE DRAWINGS

An example of assessing the performance of at least one telecommunications service area is described herein with reference to the drawings, in which.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
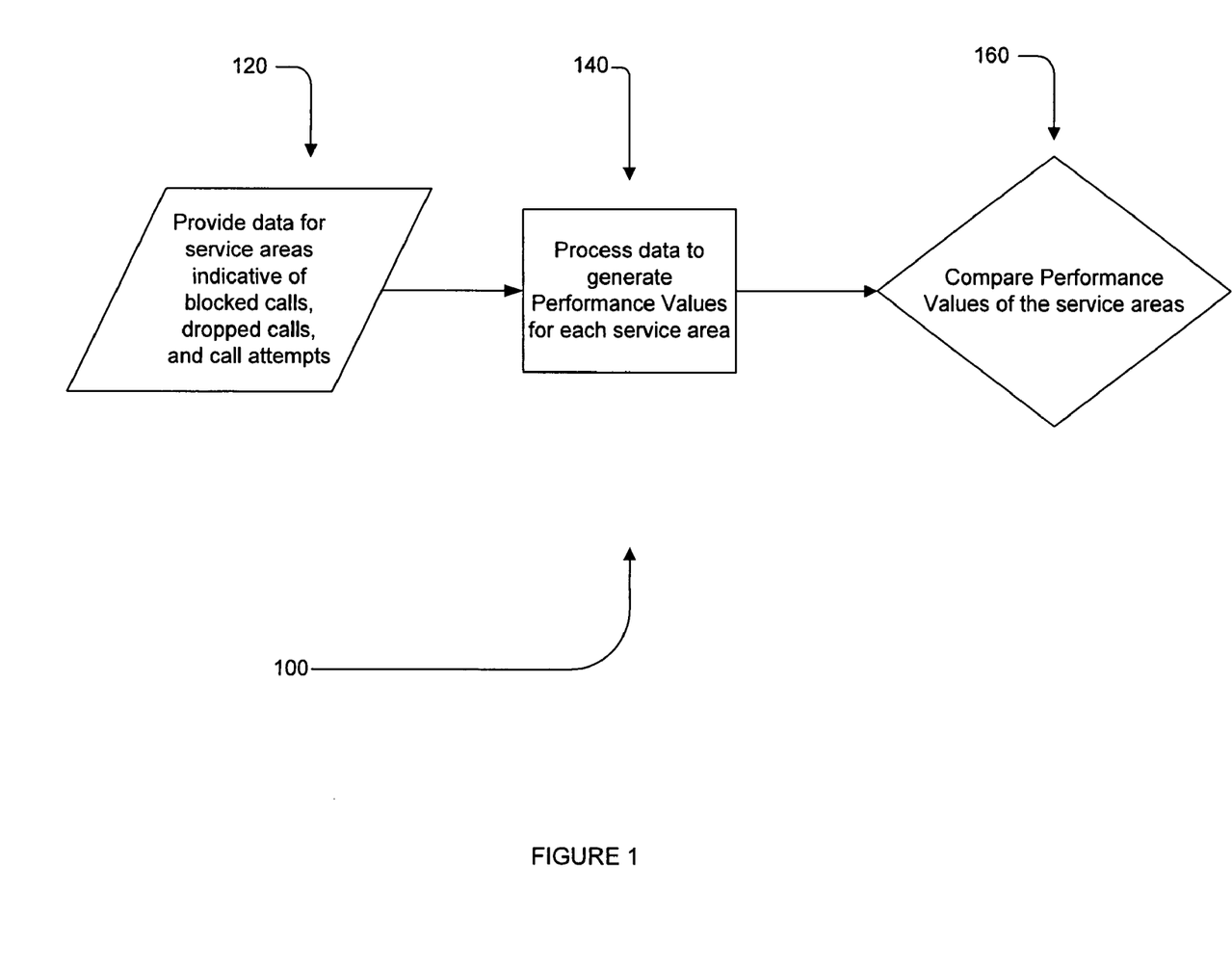
FIG. 1 is a block diagram illustrating an example of a method for assessing the comparative performance of at least two telecommunications service areas.

Referring to the drawings, FIG. 1 is a block diagram illustrating an example of a method for assessing the comparative performance of at least two telecommunications service areas. FIG. 1 shows a method 100 for assessing the relative performance of two or more service areas. As shown, data descriptive of the performance of a service area, data such as the rate of blocked calls, the rate of dropped calls, and the number of attempted calls, is provided at 120. This data is then processed at 140 to generate a Performance Value for each of the service areas. The Performance Values are then compared at 160. This comparison can be made for any number of desired reasons, including but not limited to determining which of the service areas should receive available funds for the purpose of upgrading the service within that service area.

A service area as used herein may include one or more cells, a political entity such as a city, county, or state, or even a predefined geographical region, such as one or more states.

Figure 2:
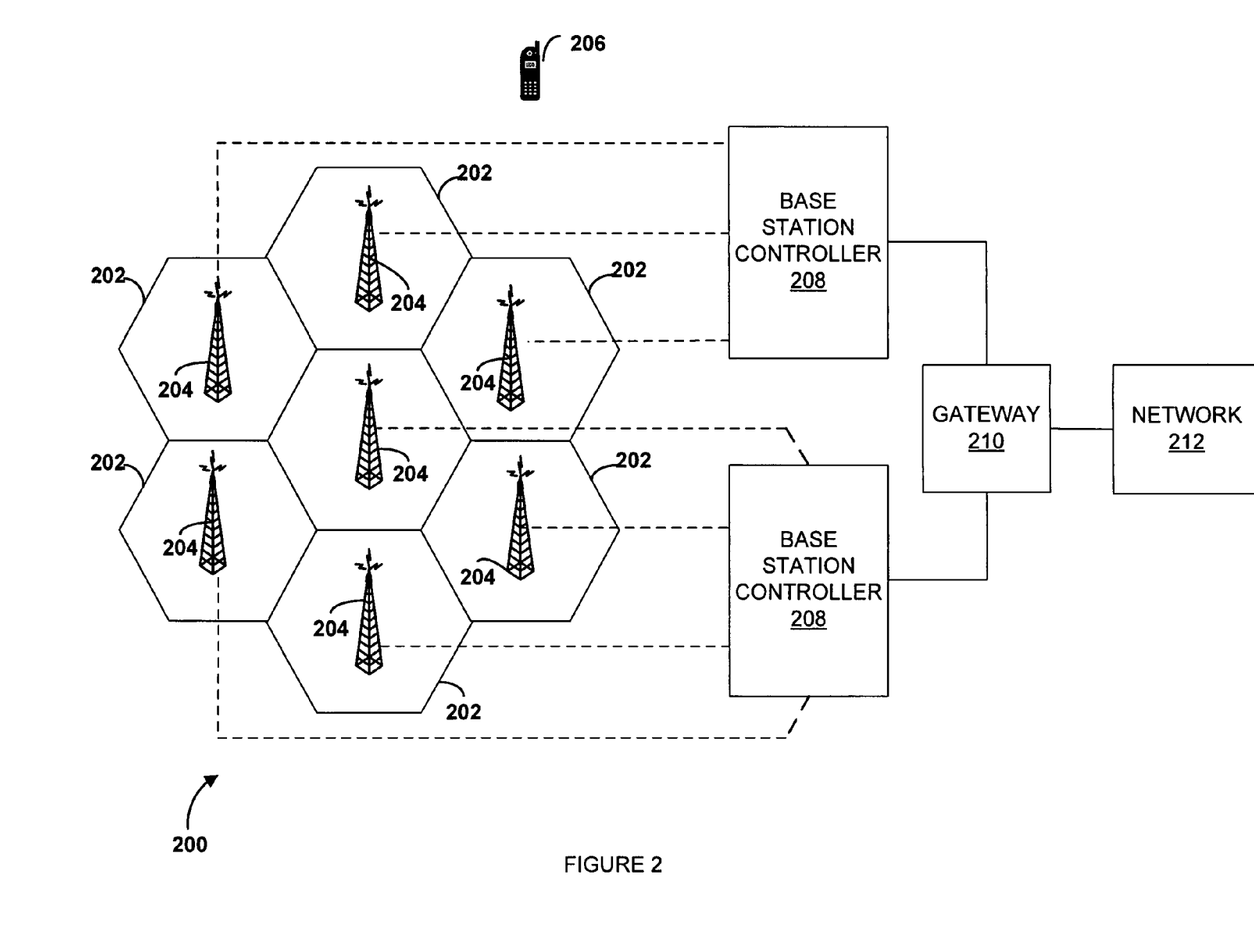
FIG. 2 is a diagram of an example of a wireless communications network in which a method for assessing the comparative performance of at least two telecommunications service areas may be employed.

FIG. 2 illustrates a simplified diagram of an example of a wireless communications network 200 in which a method for assessing the comparative performance of at least two telecommunications service areas may be employed. As shown in FIG. 2, such a network 200 includes multiple cells 202. Each cell 202 includes a base transceiver station 204. It should be understood that the hexagonal configuration of the cells 202 as shown in FIG. 2 are merely representative of an idealized coverage area of the cells. Actual cells vary widely in size and shape due to variations in environmental factors (for example, geographical features such as hills and valleys) and manmade obstructions (such as buildings or terrain alterations). Additionally, as a practical matter, some overlap in the coverage area between the cells is required to hand off mobile stations 206 that may be moving between the various cells.

Each base transceiver station 204 communicates with a base station controller 208. Controller 208 in turn communicates with a gateway element 210. Gateway element 210 may comprise a mobile switching center. Gateway 210 communicates with network 212. The network 212 may be a public switched telephone network or the Internet for instance. Other, alternative communication arrangements between the controller 208 and network 212 may also be utilized as well.

It should be understood that the foregoing wireless communication system 200 is illustrative only and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner, and location.

Figure 3A:
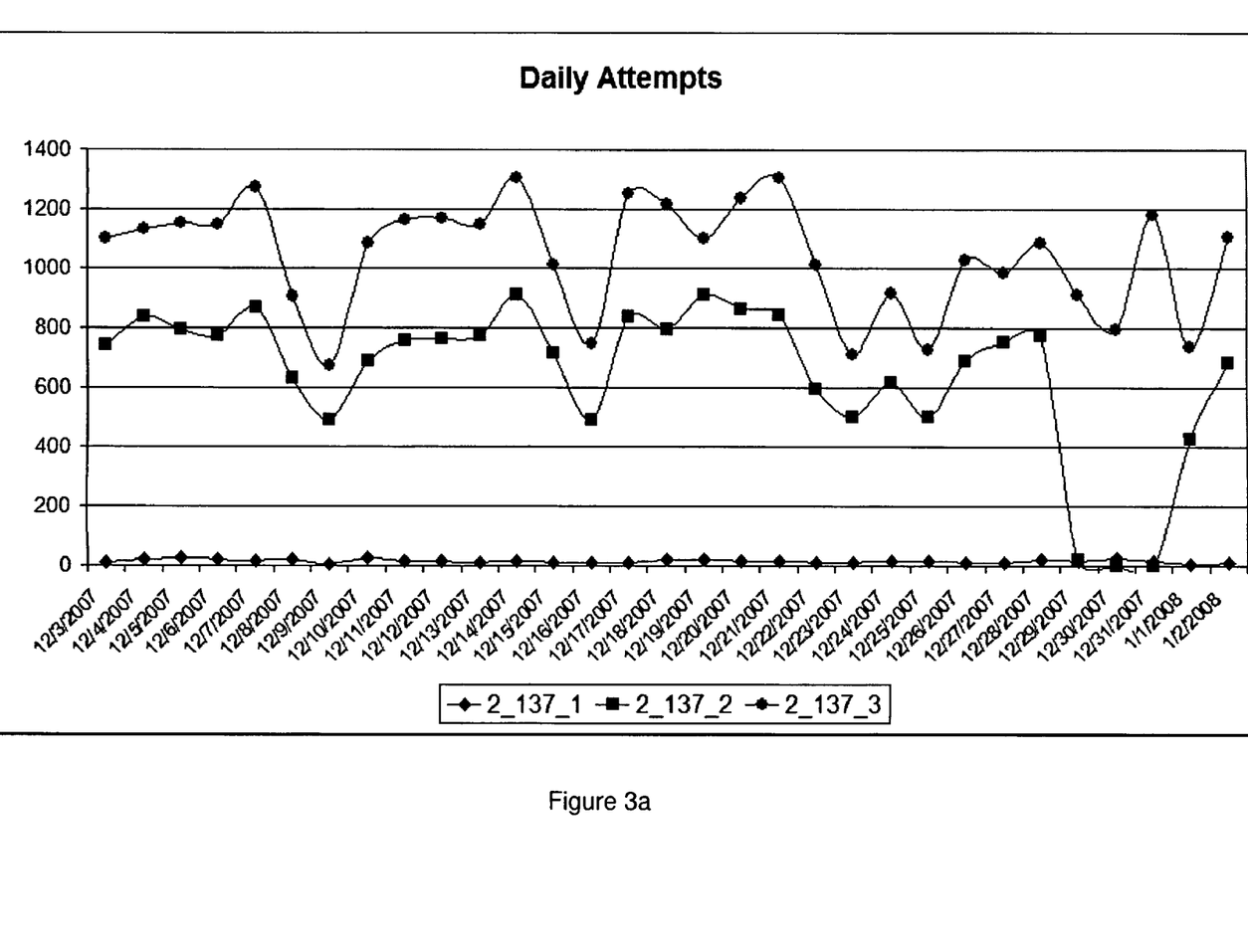
FIGS. 3a, 3b, and 3c are line graphs illustrating various measured performance factors of telecommunications service areas over time.
Figure 3B:
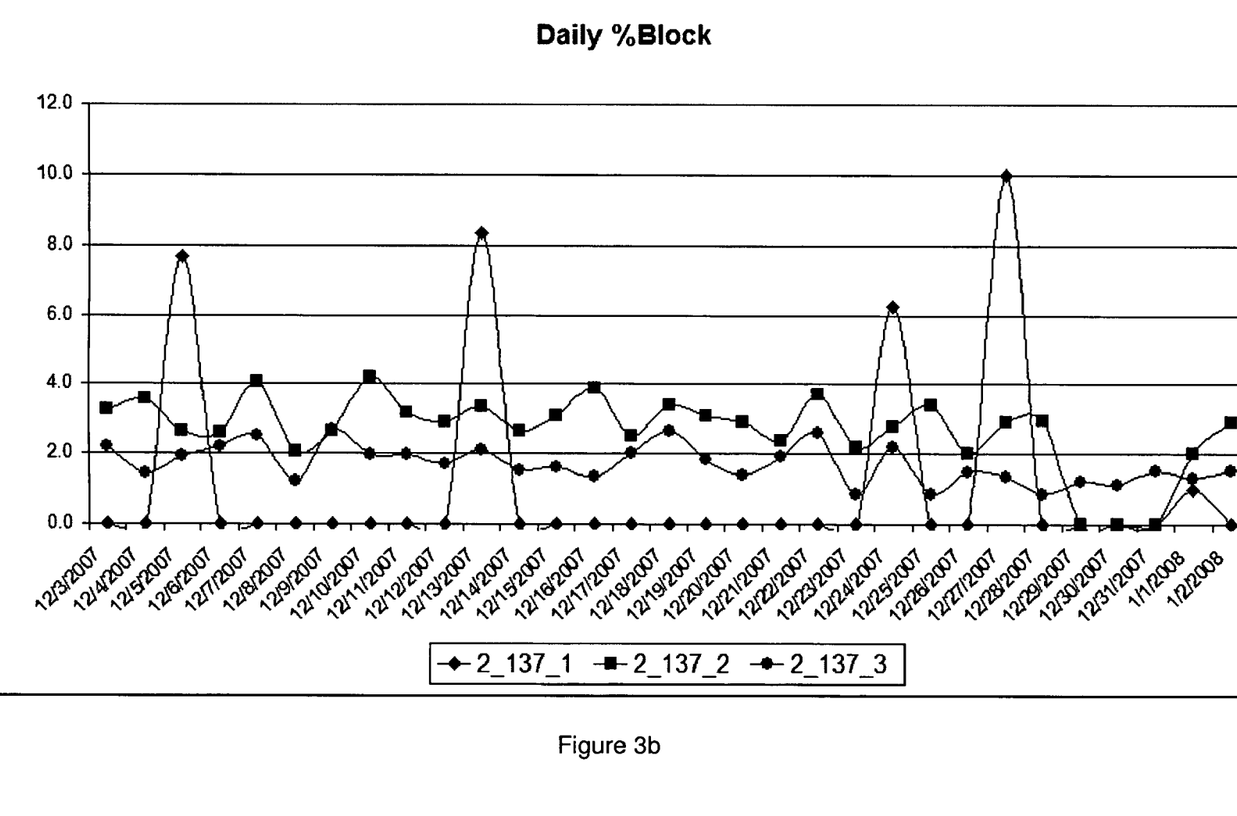
Figure 3C:
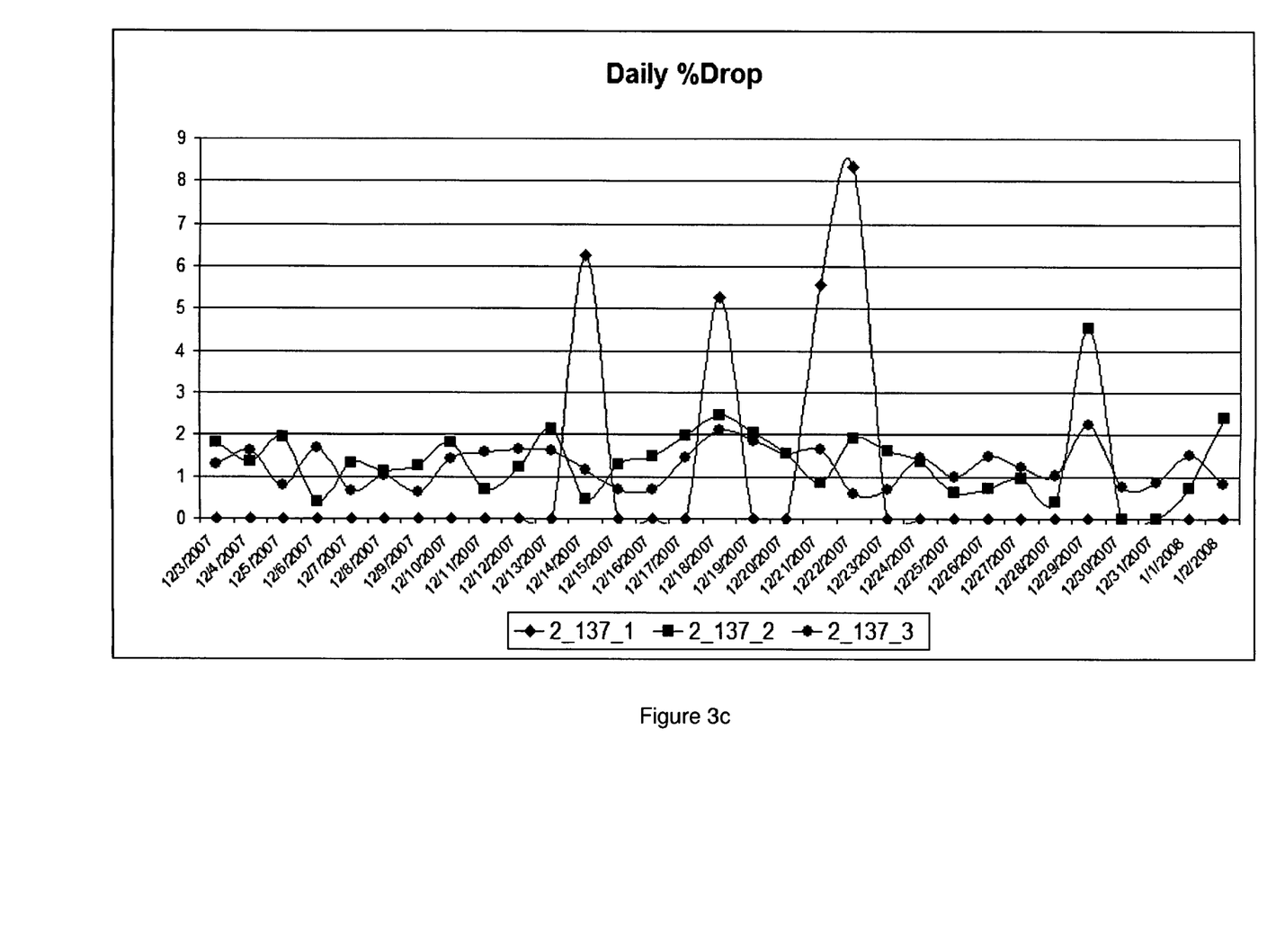

FIGS. 3a-3c illustrate line graphs of telecommunication service area data collected over a predetermined time period, which as shown here is 30 days. FIG. 3a, for example, shows how the number of attempted calls varies over time in three selected service areas labeled as service areas 2_137_1, 2_137_2, and 2_137_3. FIG. 3b depicts the variation in the number of blocked calls for the same three selected service areas while FIG. 3c shows how the number of dropped calls can vary during the same time frame in those same service areas.

It should be observed from an examination of the data shown in FIGS. 3a-3c that determining the relative performance of the three service areas is at best problematic when reviewing such information in the form provided. While one service area has a relatively low rate of dropped calls, it may have a high rate of blocked calls. These rates, of course, vary widely over time. Because of the difficulty in determining such relative performances of the various service areas, it is correspondingly difficult to determine where available, and sometimes scarce, funds should be spent to perform maintenance and replace and/or upgrade equipment or software among the various service areas to provide the most improved customer service. To provide for the most efficient use of available funds, which may lead to the actual greatest increase in customer service, it is desirable to be able to provide a quantitative figure to use in comparing the performance of one or more service areas.

Figure 4:
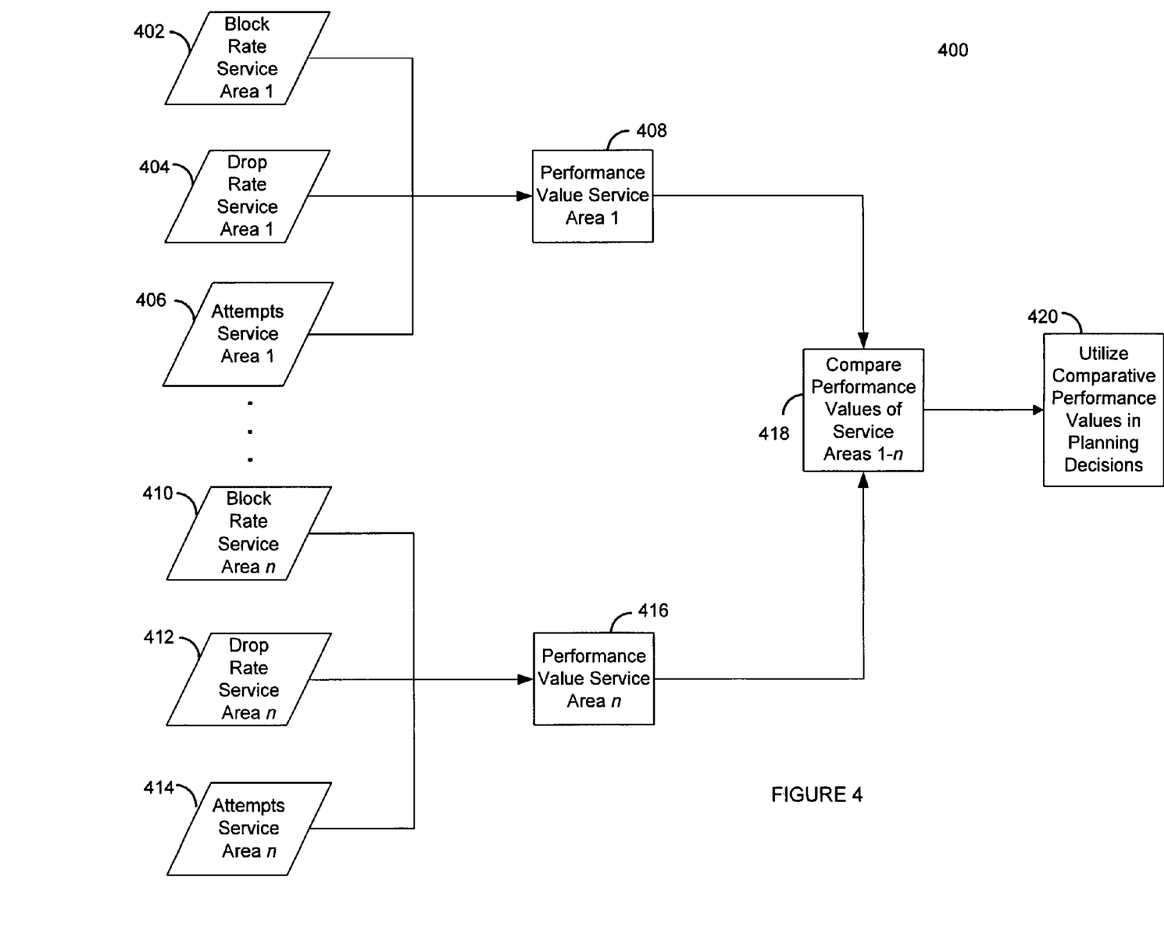
FIG. 4 is a block diagram illustrating a method of analysis of the performance of n telecommunication service areas with respect to predetermined performance factors.

FIG. 4 illustrates an example of a method 400 for providing a Performance Value for a telecommunications service area and for comparing the Performance Values of one or more service areas. As shown in FIG. 4, the call block rate for service area 1 is provided at 402, the call drop rate for service area 1 is provided at 404, and the number of attempted calls is provided at 406. The data at 402, 404, and 406 are processed at 408 to provide a Performance Value for service area 1. Similar data and calculations can be provided for any number of desired service areas. In the embodiment shown in FIG. 4, n service areas are being compared. Thus, data is provided for each service area with the dropped call rate, blocked call rate, and number of attempted calls for service area n being provided at 410, 412, and 414, respectively. The data at 410, 412, and 414 are processed at 416 to yield a Performance Value for service area n.

The Performance Values of the various service areas being processed and compared in FIG. 4 are compared at 420. The method shown in FIG. 4 and described herein provides a single quantitative value for each service area that can be compared to determine, at least used in the assessment of determining a priority, between the various service areas for maintenance, repair, replacement, or upgrade of equipment or software in order to improve the service in the service area where it is deemed that the greatest improvement in service can be obtained on the basis of the available funds.

In another example of the present invention, the Performance Value (PV) of a service area is determined for a predetermined time period according to the following equation:

$$PV = A * \sqrt{(\text{Log}(b + B) + C * \text{Log}(D * d + E) + F)} * \text{Log}(a + G)$$

wherein:
b represents the call block rate for the predetermined time period,
d represents the call drop rate for the predetermined time period, and
a represents the number of attempted calls for the predetermined time period
and the values A-G are factors as described in greater detail below.

The use of the logarithms in the foregoing equation emphasizes changes in the various parameters at lower values of drops, blocks, and attempts. The use of "Log" in the equation is meant generically. The logarithms can be taken in any base desired and the values A-G adjusted accordingly to provide a Performance Value centered around a desired number. For purposes of discussion below of specific values to use for the values A-G it will be assumed that the logarithms are being analyzed with respect to base 10.

The coefficient A scales the Performance Value to a final value that is centered about a desired number.

The values B, E, and G are provided to avoid invalid logarithm calculations under certain circumstances. That is, taking the logarithm of a, b, or d typically yields a valid logarithmic calculation. However, under certain conditions, such as short time periods or for isolated or small population service areas, a, b, or d could be zero. That is, the number of call attempts, the number of blocked calls, or the number of dropped calls could be zero for a particular service area over a particular time period of measurement. To avoid an invalid PV calculation the values B, E, and G are added to b, D*d, and a respectively. Furthermore, anticipating future improvements in software, equipment, and overall service, the values B, E, and G may be adjusted accordingly as experience indicates. Such adjustments may require adjustments to the coefficient C as a result to insure that the relative importance of blocked calls versus dropped calls is maintained.

The factor C is provided to adjust logarithmically the importance of the drop rate, while factor D is used to adjust linearly the drop rate's importance. Finally, the value F indirectly adjusts the importance of the number of call attempts.

In addition, because the sum of Log(b+B) and Log(D*d+E) could yield negative values, the value F is also provided to avoid complex solutions to the square root portion of the equation.

In one embodiment of the present invention, the values A-G may assume the following values:

A=15
B=0.3
C=10
D=3
E=1
F=1
G=1

As noted above, A can be set such that the Performance Value is centered about a desired number. Using the shown values of B-G, setting A equal to 15 yields a Performance Value centered about 100. If a final value centered about some other number is desired, A can be set to some other number. By way of example only, and using the other values of B-G given above, if a final value of PV centered around 1,000 were desired, the coefficient A could be set to 150 or if it were desired to have a PV centered around 20, A could be set to equal 3.

Figure 5:
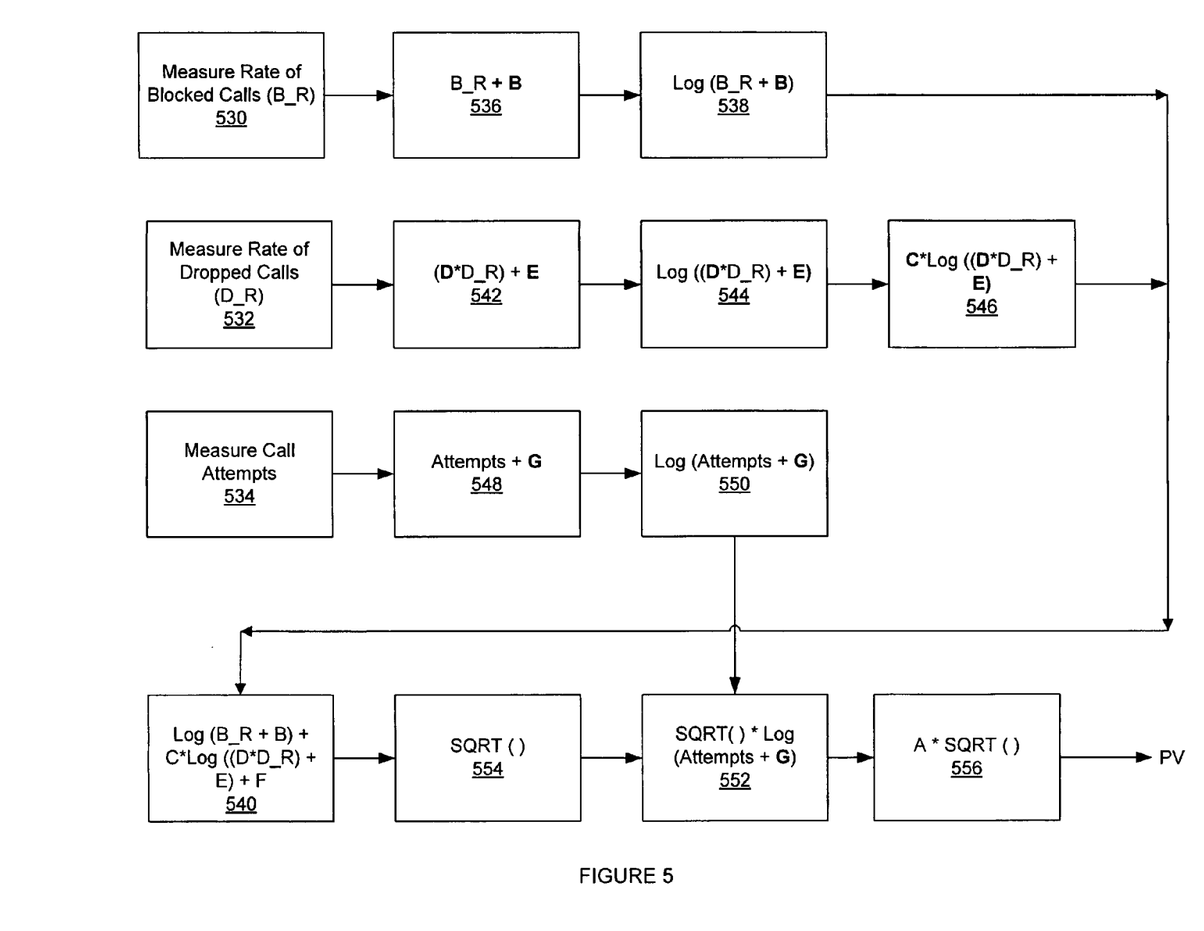
FIG. 5 is a block diagram illustrating an example of a method for assessing the comparative performance of at least two telecommunications service areas.

Referring to FIG. 5, the Performance Value may be calculated according to the foregoing equation as follows. First, there will be a measurement made of the rate of blocked calls, b, at 530; of the rate of dropped calls, d, at 532; and of the rate of attempted calls, a, at 534. After all of the measurements have been taken over the desired time period, the scaling value B will be added to the blocked call rate b at 536 and then logarithm of that sum will be taken at 538 and provided to 540.

The dropped call rate d will be multiplied by the scaling value D and the scaling value E will be added to the product at 542. The logarithm of the sum will be taken at 544 and will then be multiplied by the scaling value C at 546, with the product being provided at 540.

The number of attempted calls a will be added to the scaling value G at 548 and the logarithm of the sum taken at 550, with the result being provided to 552.

At 540 the results of 538 and 546 will be added along with the scaling value F. This sum will be provided to 554 where the square root thereof will be taken and provided to 552 where it will be multiplied times the results of 550. Finally, this product will be multiplied by the scaling value A at 556 to yield the Performance Value for a particular service area.

The various scaling values set forth above can be adjusted from the given default values as experience dictates. In addition, they can be adjusted to accommodate variations in local service area conditions. For example, if it were desired to assess the relative performance of service areas located in Kansas with those in Colorado, the scaling values could be adjusted to take into account the varied topography of the service areas being compared. Kansas has a relatively flat topography compared to Colorado. As a consequence, the dropped call rate in Kansas due to varying terrain altitudes should be less than that in Colorado. That is, the dropped call rate in Colorado, particularly the mountainous areas where cell coverage drops off as vehicles travel up and down the terrain, is normally expected to be greater than that in Kansas. Consequently, to take into account this difference in the effects of the terrain on the calculated Performance Value, the scaling value D could be adjusted upwardly for Kansas or downwardly for Colorado.

Alternatively, if performance comparisons are being made of service areas wherein the local equipment used to handle calls varied substantially so as to affect the blocked call rate, the scaling value F could be adjusted to accommodate such differences in the service areas. In this manner then, the various service areas in a variety of different geographical areas can be compared.

The blocked call rate and dropped call rate varies from one predefined service area to the next for several reasons. For example, in mountainous areas such as Denver, the altitude of the terrain can vary dramatically. Cellular telephone signals can be lost by cresting a ridge and then descending the hill on the other side. In service areas such as those found in the plains states, calls are seldom, if ever, dropped due to variations in terrain altitudes. In other service areas, the number of dropped calls may be greater than would otherwise be expected due to differences in the equipment utilized to transmit and receive cellular signals.

Where Performance Values of service areas in relatively small geographical areas, such as adjacent city suburbs, are being compared, the coefficients C, D, and F of the equation normally will remain the same. Where, however, the Performance Values of geographically separate service areas, such as Denver and Kansas City, Mo., are being compared, an adjustment may be made in the coefficients C, D, and F to account for local variations in geography and equipment.

It should be understood that the Performance Values calculated according to the present invention can be analyzed over varying time periods. Thus, by way of example only, one-day values can be calculated for particular service areas as desired and where the calculated values exceed predetermined values, the one day values can be compared to longer term values in order to determine whether the one-day value represents a short-term fluctuation. Such fluctuations may occur, for example, during gatherings of large crowds such as athletic events, political functions, religious gatherings, and social gatherings of all kinds. Making such comparisons spotlight situations where temporary base transceiver stations should be placed to handle additional call loads to provide the desired level of customer service.

The ability to detect such random fluctuations in the Performance Value as a result of occurrences such as large crowds, holidays, disasters, or the like also enables the telecommunication service provider to account for such fluctuations, if desired, in viewing the Performance Values over extended periods of time. That is, the fluctuations can be filtered from the data used to calculate the Performance Values. The service provider can thus determine whether, for example, perhaps significantly expensive equipment upgrades are needed within a particular service area or simply some temporary base stations are needed to handle increased traffic within a particular service area during particular time periods such as a professional football game. Stated otherwise, the ability to filter out the random occurrence aids the service provider in preventing overspending in particular service areas where only temporary measures are perhaps needed and under spending where more significant service improvements are needed.

In addition, the calculated Performance Values can be analyzed according to known statistical methodologies. Thus, the standard deviations can be calculated and analyzed in the Performance Values as well as the performance information to provide whatever additional analysis is desired.

By way of example only and not in limitation of the scope of the present invention as defined by the claims appended hereto, the following table provides a Performance Value for six service areas as determined by the foregoing equation and the previously discussed scaling values.

| Service Area | Block Rate | Drop Rate | Attempts | Performance Value |
|---|---|---|---|---|
| 1 | 1.0 | 0.4 | 800 | 93 |
| 2 | 0.7 | 0.6 | 2,000 | 116 |
| 3 | 0.3 | 0.8 | 300 | 92 |
| 4 | 1.2 | 0.3 | 8,000 | 117 |
| 5 | 0.5 | 0.5 | 15,000 | 138 |
| 6 | 0.8 | 0.9 | 4,000 | 140 |

It will be noted that as the Performance Value increases for the various service areas, so does the overall inefficiency of a particular service area. In the example above, service areas 5 and 6 have the largest Performance Values, but service area 5 has nearly four times the number of call attempts as does service area 6. In other words, service area 5 is performing with nearly the same Performance Value as service area 6, even though service area 5 is operating at a much higher capacity.

The calculated Performance Values of the various service areas as shown in the table above provide the operator of those telecommunications service areas with a single number to be used in evaluating steps that can be made to improve customer service. In this case, it may be deemed that overall customer service can be improved most by investing in service area 6 because it is operating with a high Performance Value with a much lower number of attempted calls than service area 5. Stated otherwise, there is a likelihood of a greater return on investment of invested funds—whether those funds are directed towards maintenance services of software or equipment, replacement of equipment, or upgrades of software or equipment—in terms of improved customer service if those funds are first directed towards improving service in service area 5.

It should be understood that the Performance Value provides just one consideration in the complex decision of which service areas to devote funds for service improvements. Its value lies in taking several data sources relating to service area performance (and, consequently, customer satisfaction with the service) and distilling it to a single, easily understood number. Final decisions on which service areas should receive funds will also take into consideration other factors such as the cost of making such improvements. Thus, as shown in the table above, even though the Performance Values may indicate that funds should be devoted to service area 6, the costs of making the necessary improvements may substantially outweigh the costs of making improvements to service area 5. Or, while costs may be nearly equal, the time frame for making such improvements may indicate that the funds should go to another service area because service can be improved relatively quickly in one or more other service areas.

Figure 6:
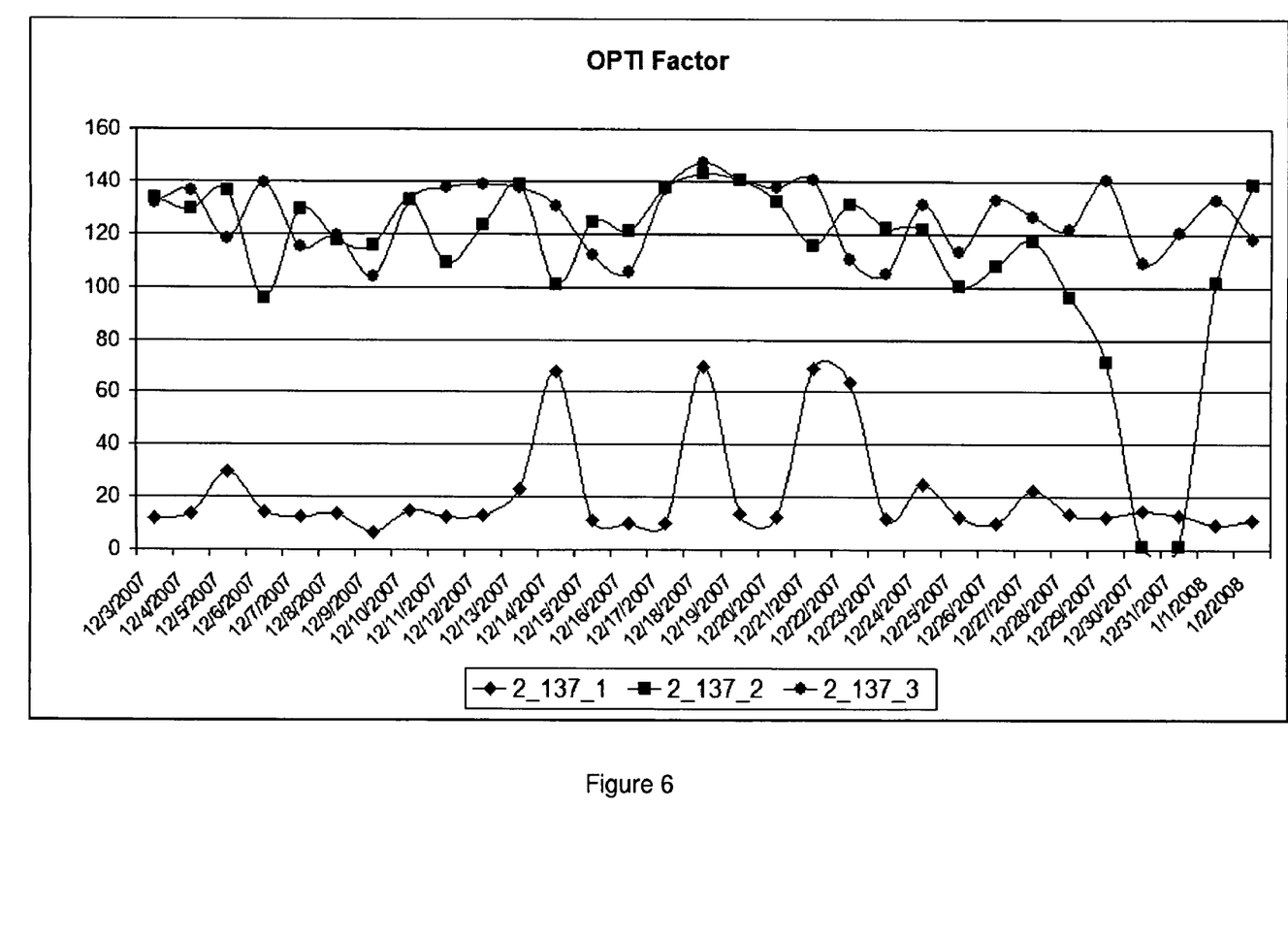
FIG. 6 is a line graph illustrating variations in calculated Performance Values for three service areas over a predetermined time frame.

FIG. 6 illustrates a line graph chart of calculated Performance Values for the service areas shown in FIGS. 3a-3c using the data shown therein for call attempts, dropped calls, and blocked calls. As seen in FIG. 6, service areas 2_137_2 and 2_137_3 have somewhat similar overall performance, though it will be noted that the performance of service area 2_137_2 varies more over shorter time periods than service area 2_137_3. It will also be observed that the Performance Value of service area 2_137_3 drops to zero over the period from Dec. 30, 2007 to Dec. 31, 2007, which is reflective of the number of call attempts—and therefore also of the number of call drops and call blocks—dropping to zero over the corresponding time period as seen in FIGS. 3a-3c.

Also seen in FIG. 6 is that the Performance Value of service area 2_137_1 appears to be relatively steady, yet experiences upward spikes on several occasions, which can be seen to be related to increases in the number of dropped calls in the corresponding time periods of service as seen in FIG. 3c. Thus, the calculated Performance Value for this service area highlights particular time frames when there may be a service problem with this particular service area. The service provider can investigate to determine what, if any, causal forces exist for such fluctuations on short time frames as this. It will also be noted from looking at FIG. 3a that there are relatively few telephone calls made in this service area when compared to the other two service areas. Thus, while well understood solutions may exist to the cause of the fluctuations in the dropped calls for service area 2_237_1, because the overall Performance Value of that service area exceeds that of the other two service areas, funds for service improvement would and should most likely be spent where the greatest service improvements can be gained, particularly in light of the fewer number of calls made from service area 2_137_1.

Figure 7:
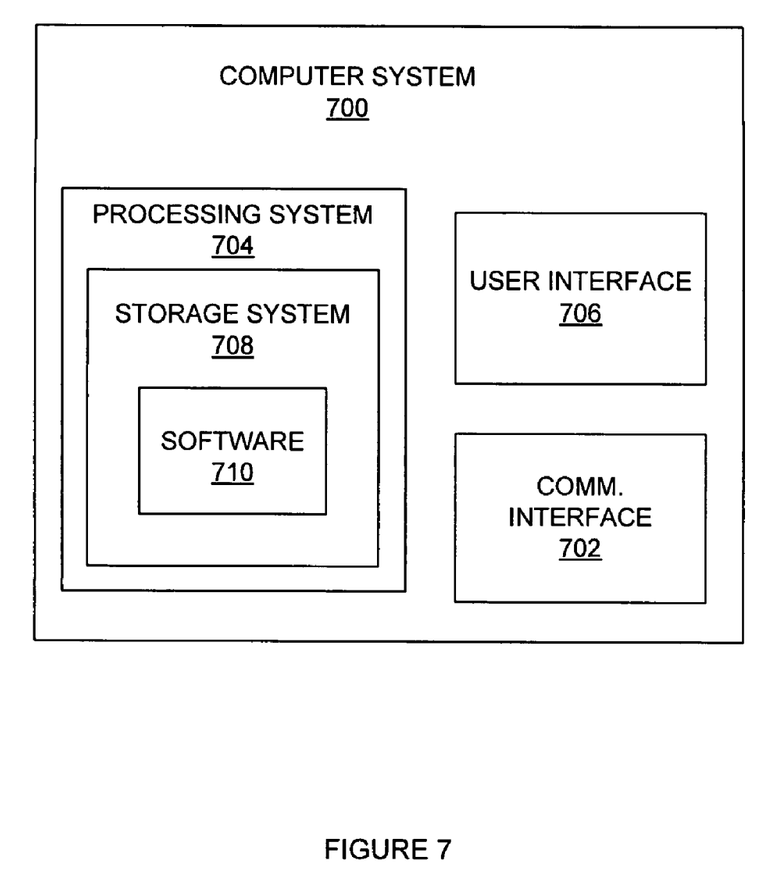
FIG. 7 is a block diagram illustrating an example of a system for assessing the comparative performance of at least two telecommunications service areas.

FIG. 7 illustrates computer system 700. Computer system 700 includes communication interface 702, processing system 704, and user interface 706. Processing system 704 includes storage system 708. Storage system 708 stores software 710. Processing system 704 is linked to communication interface 702 and user interface 706. Computer system 700 could be comprised of a programmed general-purpose computer, although those skilled in the art will appreciate that programmable or special purpose circuitry and equipment may be used. Computer system 700 may be distributed among multiple devices that together comprise elements 702-710.

Communication interface 702 could comprise a network interface, modem, port, transceiver, or some other communication device. Communication interface 702 may be distributed among multiple communication devices. Processing system 704 could comprise a computer microprocessor, logic circuit, or some other processing device. Processing system 704 may be distributed among multiple processing devices. User interface 706 could comprise a keyboard, mouse, voice recognition interface, microphone and speakers, graphical display, touch screen, or some other type of user device. User interface 706 may be distributed among multiple user devices. Storage system 708 could comprise a disk, tape, integrated circuit, server, or some other memory device. Storage system 708 may be distributed among multiple memory devices.

Processing system 704 retrieves and executes software 710 from storage system 708. Software 710 may comprise an operating system, utilities, drivers, networking software, and other software typically loaded onto a computer system. Software 710 could comprise an application program, firmware, or some other form of machine-readable processing instructions. When executed by processing system 704, software 710 directs processing system 704 to operate as described herein.

As used herein, computer system 700 may include software and hardware to implement the methods and various embodiments shown and described herein. Thus, the system 700 can be programmed to generate the Performance Values for one or more service areas as defined and as desired.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for assessing the comparative performance of at least two telecommunications service areas, the method comprising:
provliding performance information for each of the service areas comprising a service area rate of blocked calls, a service area rate of dropped calls, and a service area number of attempted calls;
processing the performance information for each of the service areas to generate a performance values for each of the service areas wherein each of the performance values is calculated based on the rate of blocked calls, the rate dropped calls, and the rate of attempted calls; and
comparing the performance values of the service areas to determine whether variations in the performance values comprise one of random fluctuations and short-term fluctuations.

2. The method of claim 1 wherein the performance values are utilized in determining priority for maintenance, replacement, or upgrade of at least one of a group of maintenance services, software upgrades, or equipment replacements for at least one of the service areas.

3. The method of claim 1 wherein comparing the performance values of the service areas to determine whether the variations in the performance values comprise one of the random fluctuations and the short-term fluctuations comprises:
determining the performance values of each of the service areas for a first time period and a second time period, wherein the second time period is shorter than the first time period; and
comparing the performance values for each of the service areas for the first and the second time periods to determine whether the variations in the performance values of the second time period comprise one of the random fluctuations and the short-term fluctuations.

4. The method of claim 1 further comprising:
determining a standard deviation for each service area for a first time period;
determining the performance value for each service area for a second time period; and
comparing the standard deviation for the first time period with the performance value for the second time period to determine which performance value changed the most during the second time period.

5. The method of claim 1 further comprising:
applying scaling values to the rate of blocked calls, the rate of dropped calls, and the number of attempted calls, wherein the performance values are calculated for at least two service areas in at least two predefined geographical areas and the scaling values are adjusted based upon local environmental factors present in the geographical areas.

6. The method of claim 1 wherein at least one service area comprises a base station wherein the base station comprises a receiver for receiving telecommunications signals and a transmitter for transmitting telecommunications signals.

7. The method of claim 1 wherein the processing of the performance information of each service area comprises calculating the performance value according to $$PV = A * \sqrt{(\text{Log}(b+B) + C*\text{Log}(D*d+E) + F)} * \text{Log}(a+G)$$

wherein
b represents the call block rate for the predetermined time period,
d represents the call drop rate for the predetermined time period, and
a represents the number of attempted calls for the predetermined time period
wherein
PV=Performance Value,
A=Scaling value to increase the final Performance Value centered on a predetermined number,
B=Scaling value to avoid an invalid logarithm calculation,
C=Scaling value to adjust logarithmically the Drop Rate,
D=Scaling value to adjust linearly the Drop Rate,
E=Scaling value to avoid an invalid logarithm calculation,
F=Scaling value to adjust indirectly the importance of the Number of Attempts, and
G=Scaling value to avoid an invalid logarithm calculation.

8. The method of claim 7 further comprising adjusting the scaling values C, D, and F to account for local environmental and equipment differences between service areas.

9. A storage system to assess the relative performance of at least two telecommunications service areas, the storage system comprising:
software configured to direct a processing system, when executed by the processing system, to process service area performance information comprising a service area number of attempted calls, a service area rate of blocked calls, and a service area rate of dropped calls, to process the performance information for each of the service areas to generate performance values for each of the service areas wherein each of the performance values is calculated based on the rate of blocked calls, the rate dropped calls, and the rate of attempted calls, and to compare the performance values of the service areas to determine whether variations in the performance values comprise one of random fluctuations and short-term fluctuations; and
at least one non-transitory memory device that stores the software.

10. The storage system of claim 9 wherein the performance values are utilized in determining priority for maintenance, replacement, or upgrade of at least one of a group of maintenance services, software upgrades, or equipment replacements for at least one of the service areas.

11. The storage system of claim 9 wherein:
the software is configured to determine the performance values of each of the service areas for a first time period and a second time period, wherein the second time period is shorter than the first time period; and
the software is configured to compare the performance values for each of the service areas for the first and the second time periods to determine whether the variations in the performance values of the second time period comprise one of the random fluctuations and the short-term fluctuations.

12. The storage system of claim 9 wherein the software is configured to direct the processing system to:
determine a standard deviation for each of the service areas for a first time period;
determine the performance values for each of the service areas for a second time period; and
compare the standard deviations for the first time period with the performance values for the second time period to determine which one of the service area performance values changed the most during the second time period.

13. The storage system of claim 9 wherein the software is configured to direct the processing system to apply scaling values to the rate of blocked calls, the rate of dropped calls, and the number of attempted calls, wherein the performance values are calculated for at least two of the service areas in at least two predefined geographical areas and the scaling values are adjusted based upon local environmental factors present in the geographical areas.

14. The storage system of claim 9 wherein the software is configured to direct the processing system to calculate the performance values according to $$PV = A * \sqrt{(\text{Log}(b+B) + C * \text{Log}(D*d+E) + F)} * \text{Log}(a+G)$$

wherein
- b represents the call block rate for the predetermined time period,
- d represents the call drop rate for the predetermined time period, and
- a represents the number of attempted calls for the predetermined time period wherein
- PV=Performance Value,
- A=Scaling value to increase the final Performance Value centered on a predetermined number,
- B=Scaling value to avoid an invalid logarithm calculation,
- C=Scaling value to adjust logarithmically the Drop Rate,
- D=Scaling value to adjust linearly the Drop Rate,
- E=Scaling value to avoid an invalid logarithm calculation,
- F=Scaling value to adjust indirectly the importance of the Number of Attempts, and
- G=Scaling value to avoid an invalid logarithm calculation.

15. The storage system of claim 14 wherein the software is configured to direct the processing system to adjust the scaling values C, D, and F to account for local environmental and equipment differences between service areas.

16. A method for assessing the performance of a telecommunications service area, the method comprising:
- providing for the telecommunications service area performance information comprising a service area rate of blocked calls, a service area rate of dropped calls, and a service area number of attempted calls; and
- processing the performance information for the service area to generate a performance values that are each calculated based on the rate of blocked calls, the rate dropped calls, and the rate of attempted calls,
- comparing the performance values for the service area to determine whether variations in the performance values comprise one of random fluctuations and short-term fluctuations.

17. The method of claim 16 wherein the service area performance values are utilized in assessing priority for maintenance, replacement, or upgrade of at least one of the group of maintenance services, software upgrades, or equipment replacements for the telecommunication service area.

18. The method of claim 16 wherein comparing the performance values for the service area to determine whether the variations in the performance values comprise one of the random fluctuations and the short-term fluctuations comprises:
- determining the performance values of the service area for a first time period and a second time period, wherein the second time period is shorter than the first time period; and
- comparing the performance values for the service area for the first and the second time periods to determine whether the variations in the performance values of the second time period-comprise one of the random fluctuations and the short-term fluctuations.

19. The method of claim 16 further comprising:
- applying scaling values to the rate of blocked calls, the rate of dropped calls, and the number of attempted calls, wherein the scaling values are adjusted based upon local environmental factors present in the service area.

20. The method of claim 16 wherein the telecommunication service area comprises a base station wherein the base station further comprises a receiver for receiving telecommunications signals and a transmitter for transmitting telecommunications signals.

21. The method of claim 16 wherein the processing of the performance information of the service area comprises calculating the Performance Value according to $$PV = A * \sqrt{(\text{Log}(\text{Block\_Rate}+B) + C * \text{Log}(D*\text{Drop\_Rate}+E) + F)} * \text{Log}(\text{Attempts}+G)$$

wherein
- PV=Performance Value,
- A=Scaling value to increase the final Performance Value centered on a predetermined number,
- B=Scaling value to avoid an invalid logarithm calculation,
- C=Scaling value to adjust logarithmically the Drop Rate,
- D=Scaling value to adjust linearly the Drop Rate,
- E=Scaling value to avoid an invalid logarithm calculation,
- F=Scaling value to adjust indirectly the importance of the Number of Attempts, and
- G=Scaling value to avoid an invalid logarithm calculation.

22. The method of claim 21 further comprising:
- adjusting the scaling values C, D, and F to account for local environmental and equipment conditions.

* * * * *